United States Patent [19]
Matsuda

[11] Patent Number: 4,982,720
[45] Date of Patent: Jan. 8, 1991

[54] CUTTING SAW BLADE

[75] Inventor: Yusaku Matsuda, Osaka, Japan

[73] Assignee: Sanwa Diamond Industrial Co., Ltd., Japan

[21] Appl. No.: 337,631

[22] Filed: Apr. 13, 1989

[51] Int. Cl.⁵ .............................................. B28D 1/04
[52] U.S. Cl. ...................................... 125/15; 30/347; 76/115
[58] Field of Search ............. 30/347, 389; 76/101 A; 83/835, 838, 651; 125/15

[56] References Cited

U.S. PATENT DOCUMENTS 2,811,960 11/1957 Fessel .................................. 125/15

Primary Examiner—Douglas D. Watts
Attorney, Agent, or Firm—Ostrolenk, Faber, Gerb & Soffen

[57] ABSTRACT

A cutting saw includes a cutting saw plate formed by bonding two thin plates having an orbicular shape together. The thin plates are bonded together by bracing or silver-alloy brazing. In fact the cutting saw plate is formed as an assemblage of two thin plates. A sinter including abrasive is formed around the periphery of the cutting saw plate. The sinter is formed in zigzag fashion in the direction of its thickness.

10 Claims, 2 Drawing Sheets

CUTTING SAW BLADE

BACKGROUND OF THE INVENTION

1. Field of the Invention

The present invention relates to a cutting saw and, more specifically, to a cutting saw for using to cut a stone material and the like.

2. Description of the Prior Art

As such a cutting saw, for example, there is the cutting saw which a sinter including abrasive such as fine diamond abrasive is formed around the periphery of one thin plate having an orbicular shape. At the time of using such cutting saw, an object to be cut is cut by applying the sinter to the object to be cut as the cutting saw is rotating.

However, such a cutting saw, as the cutting saw plate is formed with one thin orbicular plate, there is the case that the cutting saw plate is warped. In the case that the cutting saw plate is warped, the object to be cut can not be cut well.

SUMMARY OF THE INVENTION

A principal object of the present invention is, therefore, to provide a cutting saw which is less of warping in use.

The present invention relates to a cutting saw comprising a cutting saw plate formed by bonding plural thin plates having an orbicular shape together, and a sinter formed around the periphery of the cutting saw plate and including abrasive, wherein the sinter is formed in zigzag fashion in the direction of its thickness.

Thus, according to the present invention, the cutting saw plate is less of warping in use, since the cutting saw plate is formed by bonding two thin plates together. Therefore, the object to be cut can be cut well by using this cutting saw.

These objects and other objects, features, aspects and advantages of the present invention will become more apparent from the following detailed description of the embodiment of the present invention when taken in connection with the accompanying drawings.

DESCRIPTION OF THE PREFERRED EMBODIMENTS

Figure 1:
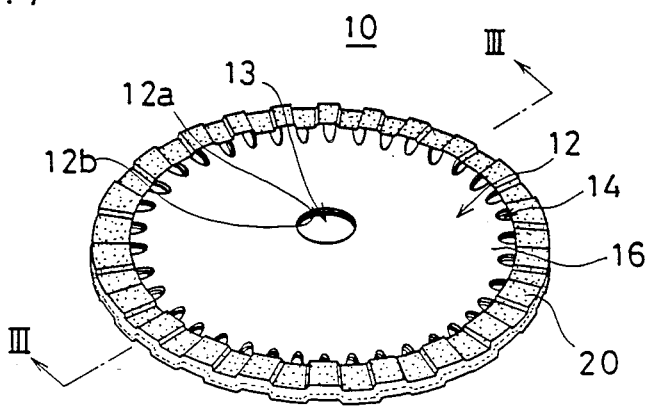
FIG. 1 is a perspective view showing one embodiment of the present invention.
Figure 2:
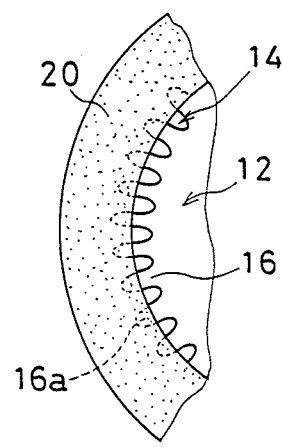
FIG. 2 is a plan view showing an essential portion of the cutting saw in FIG. 1.
Figure 3:
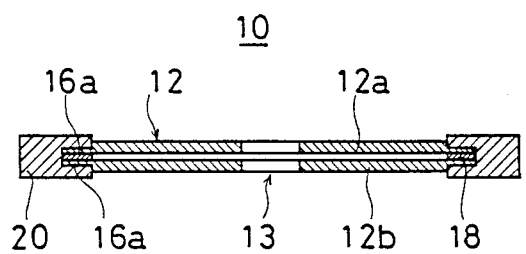
FIG. 3 is a cross-sectional view taken along line III—III in FIG. 1.

FIG. 1 is a perspective view showing one embodiment of the present invention, and FIG. 2 is a plan view showing an essential portion of the cutting saw in FIG. 1. And, FIG. 3 is a cross-sectional view taken along line III—III in FIG. 1. The cutting saw 10 includes a cutting saw plate 12. A hole 13 is opened in the center portion of the cutting saw plate 12 for being passed through with a shaft (not shown) which is used for holding the cutting saw plate 12. The cutting saw plate 12 consists of two thin orbicular plates 12a and 12b. The orbicular plates 12a and 12b are formed, for example, with a steel material. Plural recesses 14 are formed around the periphery of the orbicular plates 12a and 12b. By forming the recesses 14, plural projections 16 are formed around the periphery of the orbicular plates 12a and 12b. A steps 16a are formed between the projections 16 and the main body of the orbicular plates 12a and 12b, and therefore the projections 16 are made slightly thinner than the main body of the orbicular plates 12a and 12b. The steps 16a are made for keeping the thickness of the sinter described later thinner, when the sinter is formed.

Two orbicular plates 12a and 12b are bonded together with a bonding layer 18. The bonding layer 18 is made of a brass solder or a silver-alloy solder. The cutting saw plate 12 is formed by bonding the orbicular plates 12a and 12b together with the bonding layer 18. Two orbicular plates 12a and 12b may be bonded together by welding in space of bonding layer. As the method by welding, a spot welding may be used.

A sinter 20 is formed around the periphery of the cutting saw plate 12. The sinter 20 includes abrasive such as fine diamond abrasive. The sinter 20 is formed in zigzag fashion in the direction of its thickness. The object to be cut is cut with the sinter 20.

Figure 4:
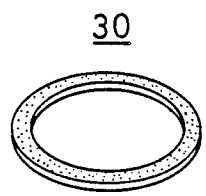
FIG. 4 is a perspective view showing a pressed powder mass for forming a sinter which is used in the cutting saw in FIG. 1.
Figure 5:
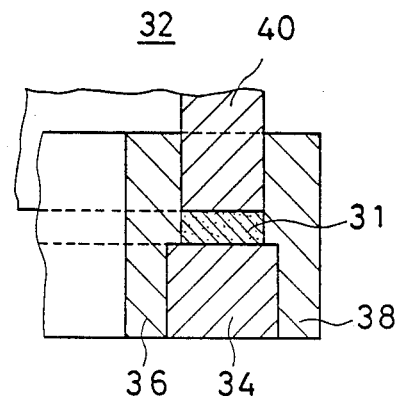

As the time of manufacturing the cutting saw 10, two orbicular plates 12a and 12b are prepared. As described above, the projections 16 are formed around the periphery of the orbicular plates 12a and 12b by forming the recesses 14. As shown in FIG. 4, a pressed powder mass 30 is prepared to be a sinter 20. The pressed powder mass 30 is made of $1 \sim 50\%$ fine diamond abrasive, a metal powder of $30 \sim 50\%$ copper, $30 \sim 50\%$ iron and $5 \sim 10\%$ tin and the like by volume. These materials 31 are fed into an apparatus 32 for preparing a pressed powder mass. As shown in FIG. 5, the apparatus 32 includes an annular mold 34. The apparatus 32 includes an inner cylinder 36 closely contacting the inner wall of the annular mold 34, and an outer cylinder 38 closely contacting the outer wall of the annular mold 34. The inner cylinder 36 and the outer cylinder 38 are formed in a stepped fashion, thereby these cylinders 36 and 38 may be placed on the annular mold 34. The apparatus 32 includes a press mold 40. The press mold 40 is formed in annular shape, and the press mold 40 is placed between the inner cylinder 36 and the outer cylinder 38. The pressed powder materials 31 are fed into the apparatus 32. The pressed powder mass 30 is formed by feeding the pressed powder materials 31 into the structure made of the annular mold 34, the inner cylinder 36 and the outer cylinder 38, and by pressing with the press mold 40. Therefore, as shown in FIG. 4, the pressed powder mass 30 is formed in annular shape.

As materials of the pressed powder mass 30, $30 \sim 50\%$ nickel, $10 \sim 70\%$ cobalt, $5 \sim 10\%$ molibdenum and $5 \sim 10\%$ tungsten may be further added by one or several kinds besides those aforementioned.

Also, in place of the metal powder mentioned above, for example, synthetic resin powder such as a phenol resin, epoxy resin or polyimide resin or the like may be selectively used.

Figure 6:
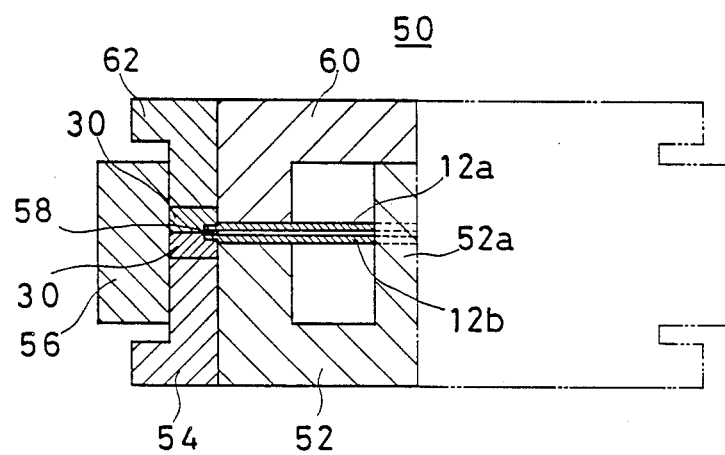
FIG. 6 is a fragmentary sectional view showing a press sintering apparatus for manufacturing the cutting saw in Fig. 1.
Figure 7:
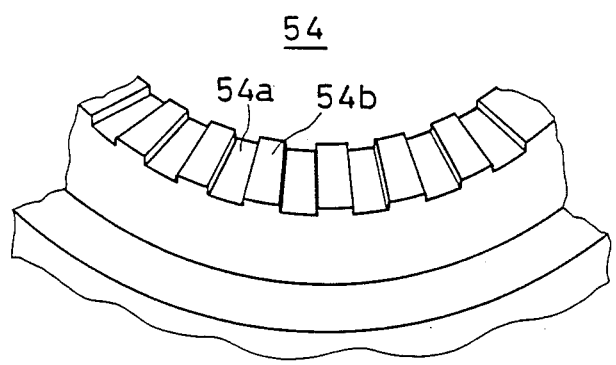
FIG. 7 is a fragmentary perspective view showing a press mold using the press sintering apparatus in FIG. 6.

The cutting saw plate 12 and the pressed powder mass 30 are fed into a press sintering apparatus 50. As shown in FIG. 6, the press sintering apparatus 50 includes a mold 52. A convex shaft 52a for passing through a hole 13 of the cutting saw plate 12 is formed in the center portion of the mold 52. A press mold 54 which is used for putting the pressed powder mass 30 is placed at the outer side of the mold 52. As for the press mold 54, as shown in FIG. 7, a concave portion 54a and a convex portion 54b are formed alternately on a portion on which the pressed powder mass 30 is put. A cylindrical mold 56 is contacted to the peripheral wall of the press mold 54. The pressed powder mass 30 is put on the press mold 54. Two orbicular plates 12a and 12b are put on the pressed powder mass 30 by being inserted with the shaft 52a of the mold 52. At this time, an orbicular bonding plate 58 which is made of a brass solder or a silver-alloy solder is sandwitched between two orbicular plates 12a and 12b. And by putting another pressed powder mass 30 on the orbicular plate 12a, the projections 16 of two orbicular plates 12a and 12b are sandwitched between two pressed powder masses 30.

An upper mold 60 is placed on the orbicular plates 12a and 12b. An upper press mold 62 is placed on the pressed powder mass 30. As for the upper press mold 62, similarly to the press mold 54, a concave portion and a convex portion are formed alternately on a portion which contacts to the pressed powder mass 30. The orbicular plates 12a and 12b, the bonding plate 58 and the pressed powder masses 30 are heated while pressing from the lower surface of the press mold 54 and the upper surface of the upper press mold 62 at a prescribed pressure. And the sinter 20 is formed by sintering two pressed powder masses 30. The sinter 20 is formed in zigzag fashion in the direction of its thickness since the pressed powder masses 30 are pressed with the press mold 54 and the upper press mold 62 having concave and convex portions. At this time, the bonding layer 18 is formed by melting the plate 58 such as a brass solder or a silver-alloy solder, and two orbicular plates 12a and 12b are bonded together. In the result, the cutting saw plate 12 is formed.

At the time of using the cutting saw 10, the sinter 20 is applied to an object to be cut as the cutting saw 10 is rotating. And the object to be cut is cut. At this time, the cutting saw plate 12 is less of warping in use, since the cutting saw plate 12 is formed by bonding two orbicular plates 12a and 12b together with the bonding layer 18. Therefore, the object to be cut such as a stone material can be cut well by using the cutting saw 10.

At the time of using the cutting saw 10, a heat of the cutting saw plate 12 is radiated into the air, since the recesses 14 are formed around the periphery of the cutting saw plate 12. Therefore, a heat generating in the cutting saw plate 12 is radiated into the air at the time of cutting the object to be cut, and a deterioration of the cutting saw 10 is prevented.

Since the sinter 20 is formed in zigzag fashion in the direction of its thickness, a seam between two pressed powder masses 30, that is, a portion which an abrasive is not present is formed in zigzag fashion. Therefore, by using the cutting saw 10, a portion which an abrasive is present can be applied to the object to be cut on an average, and the object to be cut can be cut well.

In the aforementioned embodiment, though a brass solder or a silver-alloy solder is used for forming the bonding layer 18, in place of such material, a synthetic resin may be used. The orbicular plates 12a and 12b may be bonded together by welding such as spot welding.

Meanwhile, in place of the fine diamond abrasive using for the sinter 20, an abrasive such as cubic boron nitride (CBN) or the like may be selected.

Although the present invention has been described and illustrated in detail, it is clearly understood that the same is by way of illustration and example only and is not to taken by way of limitation, the spirit and scope of the present invention being limited only by the terms of the apended claims.

What is claimed is:

1. A cutting saw, comprising:
    a cutting saw plate including a first thin circular plate and a second thin circular plate, said first thin plate and said second thin plate being overlaid on each other and being bonded to each other, said cutting saw plate having a periphery; and
    a sinter formed around said periphery of said cutting saw plate, said sinter comprising two circular pressed powder masses overlaid on each other, said pressed powder masses each including abrasive, said sinter being formed with a zigzag shape in the direction of its thickness by the uniting of said powder masses by heating and pressing on both sides of said powder masses while said powder masses surround said periphery of said cutting saw plate, said sinter including a seam between said pressed powder masses that is zigzag shaped in the direction of thickness of the plate.

2. A cutting saw, comprising:
    a cutting saw plate including a first thin circular plate and a second thin circular plate, said first thin plate and said second thin plate being overlaid on each other and being bonded to each other, said cutting saw plate having a periphery, plural projections being formed around the periphery of said cutting saw plate by forming plural recesses around the periphery of said cutting saw plate; and
    a sinter formed around said periphery of said cutting saw plate, said sinter comprising two circular pressed powder masses overlaid on each other, said pressed powder masses each including abrasive, said sinter being formed with a zigzag shape in the direction of its thickness by the uniting of said powder masses by heating and pressing on both sides of said powder masses while said powder masses surround said periphery of said cutting saw plate, wherein a portion of said projections of said cutting saw plate are surrounded by said sinter and wherein a portion of said recesses of said cutting saw plate are not surrounded by said sinter.

3. A cutting saw, comprising;
    a cutting saw plate including a first thin circular plate and a second thin circular plate, said first thin plate and said second thin plate being overlaid on each other and being bonded to each other, said cutting saw plate having a periphery, plural projections being formed around said periphery by forming plural recesses around said periphery, said projections including radially inner portions and radially outer step portions, said outer step portions being thinner then said inner portions; and
    a sinter formed around said periphery of said cutting saw plate, said sinter comprising two circular pressed powder masses overlaid on each other, said pressed powder masses each including abrasive, said sinter being formed with a zigzag shape in the direction of its thickness by the uniting of said powder masses by heating and pressing on both sides of said powder masses while said powder masses surround said periphery of said cutting saw plate, said sinter including a seam between said pressed powder masses that is zigzag shaped in the direction of thickness of the plate, wherein said radially outer step portions of said projections are surrounded by said sinter, wherein said radially inner portions of said projections are not surrounded by said sinter and wherein a portion of said recesses of said cutting saw plate are not surrounded by said sinter.

4. A cutting saw as recited in claim 3, wherein said cutting saw plate is formed by bonding said two thin plates with a brass solder or a silver-alloy solder.

5. A cutting saw as recited in claim 3, wherein said cutting saw plate is formed by bonding said two thin plates by welding.

6. A cutting saw as recited in claim 3, wherein said plural thin plates are formed with a steel material.

7. A cutting saw as recited in claim 3, wherein said abrasive is a fine diamond abrasive.

8. A cutting saw as recited in claim 3, wherein said abrasive is a cubic boron nitride (CBN) abrasive.

9. The cutting saw of claim 3 wherein said thin plates of said cutting saw plate are shaped to define an empty space between radially inner portions of said circular thin plates.

10. The cutting saw of claim 3, wherein each of said thin plates includes a hole for receiving a shaft.

* * * * *

UNITED STATES PATENT AND TRADEMARK OFFICE
CERTIFICATE OF CORRECTION

PATENT NO. : 4,982,720

DATED : Jan. 8, 1991

INVENTOR(S) : Yusaku Matsuda

It is certified that error appears in the above-identified patent and that said Letters Patent is hereby corrected as shown below:

On the title page:
At line [30] insert the following:

--Foreign Application Priority Data

Apr. 14, 1988 [JP] Japan...................63-92354

Signed and Sealed this

Thirtieth Day of June, 1992

Attest:

DOUGLAS B. COMER

Attesting Officer

Acting Commissioner of Patents and Trademarks